(12) United States Patent
Sonderegger

(10) Patent No.: US 10,343,516 B2
(45) Date of Patent: Jul. 9, 2019

(54) FUEL TANK ARRANGEMENT FOR A DUAL FUEL INTERNAL COMBUSTION ENGINE

(71) Applicant: VOLVO TRUCK CORPORATION, Göteborg (SE)

(72) Inventor: Sigurd Sonderegger, Askim (SE)

(73) Assignee: Volvo Truck Corporation, Göteborg (SE)

( * ) Notice: Subject to any disclaimer, the term of this patent is extended or adjusted under 35 U.S.C. 154(b) by 0 days.

(21) Appl. No.: 15/766,689

(22) PCT Filed: Oct. 9, 2015

(86) PCT No.: PCT/EP2015/073474
§ 371 (c)(1),
(2) Date: Apr. 6, 2018

(87) PCT Pub. No.: WO2017/059929
PCT Pub. Date: Apr. 13, 2017

(65) Prior Publication Data
US 2018/0304740 A1    Oct. 25, 2018

(51) Int. Cl.
*F02M 37/00* (2006.01)
*F02M 33/08* (2006.01)
(Continued)

(52) U.S. Cl.
CPC ...... *B60K 15/03519* (2013.01); *B60K 15/035* (2013.01); *F02D 19/0642* (2013.01); *F02D 19/0665* (2013.01); *F02D 19/0668* (2013.01); *F02M 21/0218* (2013.01); *F02M 33/08* (2013.01); *F02M 37/0052* (2013.01);
(Continued)

(58) Field of Classification Search
CPC ...... F02M 31/18; F02M 25/089; F02M 37/22; F02M 21/0218; F02M 21/0224; F02M 33/08; F02M 37/0064; F02M 37/0076; F02D 19/0647; F02D 41/0027; F02D 19/0642
See application file for complete search history.

(56) References Cited

U.S. PATENT DOCUMENTS 6,553,974 B1 *  4/2003  Wickman ............... F02M 37/20
                                                                123/516
6,694,955 B1 *  2/2004  Griffiths ............... F02M 25/089
                                                                123/509
(Continued)

FOREIGN PATENT DOCUMENTS

KR         20120051461 A       5/2012

OTHER PUBLICATIONS

InternationalSearch Report (dated Mar. 11, 2016) for corresponding International App. PCT/EP2015/073474.

*Primary Examiner* — Long T Tran
(74) *Attorney, Agent, or Firm* — WRB-IP LLP

(57) ABSTRACT

A fuel tank arrangement for a dual fuel internal combustion engine includes a fuel tank arranged to supply liquid fuel to the dual fuel internal combustion engine, wherein the fuel tank arrangement includes a return conduit connected to the fuel tank and configured to supply leaked fuel from the dual fuel internal combustion engine to the fuel tank, wherein the fuel tank arrangement includes a first fuel separation arrangement positioned in fluid communication between the fuel tank and an outlet to an ambient environment thereof.

12 Claims, 4 Drawing Sheets

(51) Int. Cl.
  *B60K 15/035*   (2006.01)
  *F02M 43/00*    (2006.01)
  *F02M 21/02*    (2006.01)
  *F02D 19/06*    (2006.01)
  *F02M 43/04*    (2006.01)
  *F02D 41/00*    (2006.01)
  *B60K 15/03*    (2006.01)

(52) U.S. Cl.
  CPC .... *F02M 37/0064* (2013.01); *F02M 37/0082* (2013.01); *F02M 43/00* (2013.01); *F02M 43/04* (2013.01); *B60K 2015/03355* (2013.01); *B60K 2015/03509* (2013.01); *B60Y 2200/14* (2013.01); *B60Y 2200/145* (2013.01); *F02D 41/0025* (2013.01); *F02D 41/0027* (2013.01); *Y02T 10/32* (2013.01); *Y02T 10/36* (2013.01)

(56) References Cited

U.S. PATENT DOCUMENTS

| | | | |
|---|---|---|---|
| 8,985,064 B2* | 3/2015 | Shigetoyo | F02M 53/04 |
| | | | 123/1 A |
| 2002/0108604 A1 | 8/2002 | Distelhoff et al. | |
| 2009/0266342 A1 | 10/2009 | Morales | |
| 2010/0083938 A1 | 4/2010 | Dunkle et al. | |
| 2011/0155102 A1* | 6/2011 | Ten Broeke | F02D 19/0605 |
| | | | 123/446 |
| 2012/0186560 A1 | 7/2012 | Lund | |
| 2012/0325180 A1 | 12/2012 | Montgomery | |
| 2014/0174410 A1 | 6/2014 | Myers et al. | |
| 2014/0311445 A1* | 10/2014 | Ten Broeke | F02D 19/0621 |
| | | | 123/304 |
| 2016/0265478 A1* | 9/2016 | Oversby | F17C 7/02 |

\* cited by examiner

FUEL TANK ARRANGEMENT FOR A DUAL FUEL INTERNAL COMBUSTION ENGINE

BACKGROUND AND SUMMARY

The present invention relates to a fuel tank arrangement for dual fuel internal combustion engine of a vehicle. The invention also relates to a vehicle comprising such a fuel tank arrangement. The invention is applicable on vehicles, in particularly low, medium and heavy duty vehicles commonly referred to as trucks. Although the invention will mainly be described in relation to a truck, it may also be applicable for other type of vehicles such as e.g. working machines, cars, etc.

In relation to propulsion systems for vehicles, such as heavy duty vehicles, internal combustion engines are frequently used. These internal combustion engines are most often propelled by a combustible fuel such as e.g. diesel or petrol. However, in order to further reduce engine emissions of the vehicles, alternative propulsion methods and/or fuels are being used, either alone or in combination with the well known combustible fuels. These may include, for example, ethanol or electrical propulsion from an electric machine, etc.

As a further alternative, a combustible gas, such as e.g. compressed or liquefied natural gas, DME, biogas, etc. has been found a suitable propulsion fuel for vehicles in the form of trucks. The combustible gas can be used in combination with the combustible fuel for propelling the internal combustion engine, in the following referred to as a dual fuel internal combustion engine. Since the residuals from the combustible gas are relatively environmentally friendly in comparison to e.g. combustible fuels, pollution from the emissions may be reduced for these types of engines.

However, for the above described dual fuel internal combustion engines there is a risk that combustible gas can leak from the engine back to the diesel tank. Combustible gas is in these cases mixed with the combustible fuel in the fuel tank and there is a risk that the gases leak to the ambient environment therefrom.

US 2012/0325180 relates to a method for operating an electrically controlled dual fuel compression ignition engine. US 2012/0325180 describes a natural gas tank connected to a gas fuel common rail, and a file tank which is connected, to a liquid fuel common rail. Natural gas and liquid fuel are mixed in a coaxial quill assembly before being provided into the cylinders of the engine. Furthermore, a drain outlet is fluidly connected to the fuel tank to drain fuel from the injectors to the fuel tank. However, US 2012/0325180 is still in need of further development with regards to handling of gases in case of leakage.

Furthermore, US 2010/0083938 relates to a marine carbon canister. In detail, US 2010/0083938 relates to a fuel tank vent system that includes a carbon canister. Fuel vapor discharged from the fuel tank included in the engine fuel system flows during certain conditions into the carbon canister to encounter charcoal stored in the carbon canister.

It is desirable to provide a fuel tank arrangement which at least partially overcomes the deficiencies of the prior art.

According to a first aspect of the present invention, there is provided a fuel tank arrangement for a dual fuel internal combustion engine, the fuel tank arrangement comprising a fuel tank arranged to supply liquid fuel to the dual fuel internal combustion engine, wherein the fuel tank arrangement comprises a return conduit connected to the fuel tank and configured to supply leaked fuel from the dual fuel internal combustion engine to the fuel tank, wherein the fuel tank arrangement comprises a first fuel separation arrangement positioned in fluid communication between the fuel tank and an outlet to an ambient environment thereof.

A dual fuel internal combustion engine should be understood to mean a combustion engine which can be propelled by both a combustible gas and a combustible fuel, or a mixture thereof. The combustible fuel may, for example, be diesel or petrol. However, the present invention should not be construed as limited to any specific alternative.

Furthermore, a fuel separation arrangement should be understood to mean an arrangement which is able to separate liquids from gases, or vice versa, which will be described further below. Still further the wording "fluid communication" should in the following and throughout the description be interpreted as valid for fluids in liquid phase as well as in gas phase.

When combustible gas ends up in the fuel tank, there is an increase in pressure therein which is in need of ventilation. The ventilation may thus be necessary in order to avoid e.g. burst of the tank. An advantage of the present invention is thus that combustible gases which have accidentally leaked from the dual fuel internal combustion engine into the fuel tank can be separated from the combustible fuel during venting. Hereby, the combustible fuel can, by means of the first fuel separation arrangement, be returned to e.g. the fuel tank, while the combustible gas, which is relatively free from mixture with combustible fuel, can be directed towards the ambient environment of the vehicle. It is thus a reduced risk of spilling liquid fuel. As an example, it may be beneficial to vent the combustible gas at the top of a so-called vent stack of the vehicle, which is positioned above the chassis department of the vehicle. An advantage is thus that the combustible gases will be vented at a position which is free from inhalation since the density of the combustible gas is lower than air and will thus rise from a relatively high position. A further advantage of venting the combustible gas at the relatively high position of the vehicle is that there is a reduced risk of gas ignition since the environment at the vent stack is free from high temperature vehicle components.

Furthermore, throughout the entire description of the application, the wordings "above" and "below" should be understood to relate to a vertical direction of the vehicle. The vertical direction should be seen in relation to a vehicle standing on a relatively flat/horizontal surface. Likewise, the wordings "upper" and "lower" should also be understood to relate to a vertical direction of the vehicle.

According to an example embodiment, the fuel tank arrangement may comprise a gas tank arranged to supply combustible gas to the dual fuel internal combustion engine.

The wording "combustible gas" should in the following and throughout the entire description be interpreted as a gas which can be ignited, either self-ignited by compression or be ignited by e.g. a spark plug. The invention should thus not be limited to any specific combustible gas. However, as a non-limiting example, the combustible gas may be natural gas, which is described further below. Other alternatives are of course conceivable such as e.g. H2, DME, biogas, gaseous hydrocarbons, etc. The combustible gas which can be provided in the gas tank can be in liquid phase and in gas phase. Hence, the wording "combustible gas" should be interpreted to include liquefied gas as well as gas in gas phase.

According to an example embodiment, the gas tank may be a pressurized gas tank. A pressurized gas tank, or a pressure vessel, is advantageous since it can store high-pressure gas which is suitable for propelling, the dual fuel internal combustion engine.

According torn example embodiment, the first fuel separation arrangement may be positioned at an upper level of the fuel tank.

As described above, the upper level of the fuel tank should be understood as an upper position of the fuel tank as seen in the vertical direction of the vehicle when the vehicle is standing on a relatively horizontal surface. Hence, the upper level of the fuel tank is not the upper position of the tank when the vehicle is standing/driving in an uphill or a downhill slope etc. Positioning the first fuel separation arrangement at the upper level of the fuel tank thus, ensures that combustible gas present in the fuel tank will be provided there through since it will rise towards the surface of the liquid fuel.

According to an example embodiment, the first fuel separation arrangement may comprise a cavity, at least one inlet through-hole between the cavity and the fuel tank, a return through-hole between the cavity and the fuel tank, and an outlet conduit in fluid communication with the outlet to the ambient environment.

When the mixture of liquid fuel and combustible gas enters the cavity of the first fuel separation arrangement through the at least one inlet through-hole, the mixture will be directed towards an inner surface of the cavity. Hereby, the velocity of the mixture will be reduced. Due to gravity, the relatively heavy liquid fuel will be directed downwards through the return through-hole back to the fuel tank while the combustible gas, which has a density lower than air, will rise and be directed through the outlet conduit. Accordingly, and as an example embodiment, the at least one inlet through-hole may be arranged at a position between the return through-hole and the outlet conduit, as seen in a vertical direction thereof. The outlet conduit is thus positioned above the return through-hole.

According to an example embodiment, a cross-sectional area of the at least one inlet through-hole may be smaller than a cross-sectional area of the cavity. An advantage is that the velocity of the mixture, of fuel and combustible gas will be reduced which will further ensure that the heavier liquid fuels will be directed downwards and back into the fuel tank.

According to an example embodiment, the fuel tank arrangement may comprise a second fuel separation arrangement positioned in fluid communication between the first fuel separation arrangement and the outlet to the ambient environment.

An advantage of using a second fuel separation arrangement is that it is further ensured that liquid fuels will not be leaked to the ambient environment. Hence, in the unlikely event that liquid fuel will be present as a mixture with combustible gas downstream the first fuel separation arrangement; the second fuel separation arrangement will further reduce the probability of liquid fuel leakage to the ambient environment thereof. A further advantage of the second fuel separation arrangement is that e.g. rain water from the ambient environment that has entered the second fuel separation arrangement will be separated and prevented from entering the fuel tank. The second fuel separation arrangement thus has a dual function of preventing liquid fuel from being directed to the ambient environment and rain water from the ambient environment from entering the fuel tank.

According to an example embodiment, the second fuel separation arrangement may comprise an inlet conduit and an outlet conduit arranged in fluid communication with each other. According to an example embodiment, the inlet conduit may be positioned relative to the outlet conduit with an angle between 65-115 degrees.

Hereby, the mixture of liquid fuel and combustible gas will be directed through the inlet conduit and hit the inner surface of the outlet conduit. Hereby, the velocity of the mixture will be reduced and the liquid fuel will be directed downwards to a drain tank, or the like, and the combustible gas will be directed upwards towards the ambient environment.

According to an example embodiment, a cross-sectional area of the inlet conduit of the second fuel separation arrangement may be smaller than a cross-sectional area of the outlet conduit of the second fuel separation arrangement. An advantage is that the velocity of the mixture of liquid fuel and combustible gas will be reduced when entering the outlet conduit, which will further ensure that the heavier liquid fuel will be directed downwards to e.g. a drain tank or back to the fuel tank.

According to an example embodiment, the fuel tank arrangement may comprise a conduit connected upstream the inlet conduit of the second fuel separation arrangement, wherein the conduit and the inlet conduit of the second fuel separation arrangement are arranged approximately perpendicular relative to each other.

Hereby, a further position is provided where the velocity of the mixture of liquid fuel and combustible gas can be reduced. This is due to the fact that the mixture will hit the inner surface of the inlet conduit. The wording "perpendicular" should be understood to include normal tolerances.

According to an example embodiment, the fuel tank arrangement may comprise a pressure relief valve positioned downstream the first fuel separation arrangement.

An advantage of the pressure relief valve is that a safety device is provided for the fuel tank such that the pressure in the fuel tank will be kept at acceptable levels. Hence, the risk of bursting the fuel tank is reduced.

According to an example embodiment, the outlet to the ambient environment may be positioned at a level vertically above a vehicle compartment of a vehicle to which the fuel tank arrangement is mounted. As described above, an advantage is that the combustible gas will be vented to the ambient environment at a position which, people will not be able to inhale them. Since the density of the combustible gas is lower than air, the combustible gas will thus rise from this relatively high position.

According to a second aspect of the present invention, there is provided a vehicle comprising a dual fuel internal combustion engine for propulsion thereof, wherein the vehicle comprises a fuel tank arrangement according to any one of the above described example embodiments of the first aspect of the present invention.

Effects and features of this second aspect are largely analogous to those described above in relation to the first aspect of the present invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as, additional features and advantages of the present invention, will be better understood through the following illustrative and non-limiting detailed description of exemplary embodiments of the present invention, wherein.

DETAILED DESCRIPTION

Figure 1:
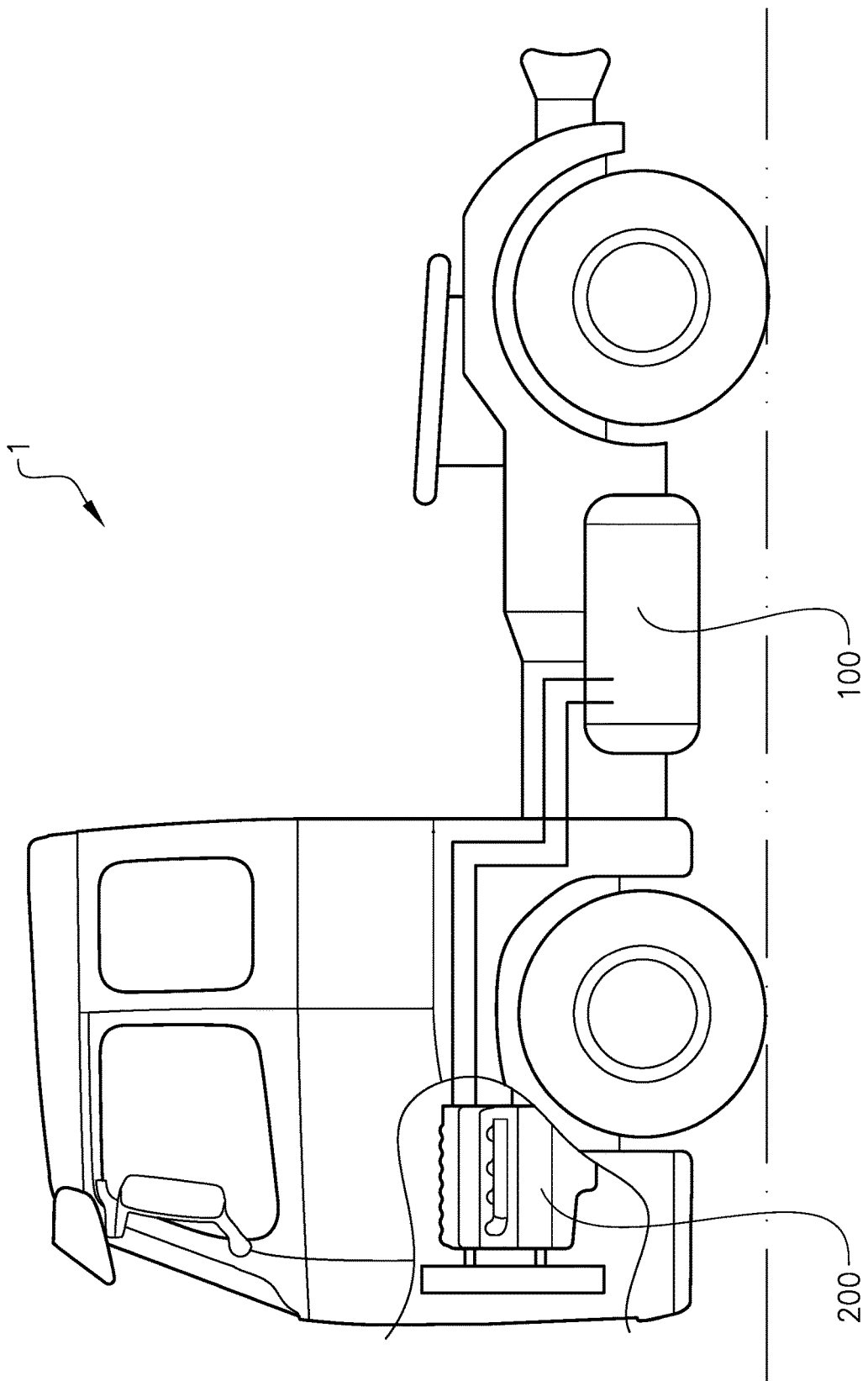
FIG. 1 is a lateral side view illustrating an example embodiment of a vehicle in the form of a truck.

The present invention will now be described more fully hereinafter with reference to the accompanying drawings, in which an exemplary embodiment of the invention is shown. The invention may, however, be embodied in many different forms and should not be construed as limited to the embodiment set forth herein; rather, this embodiment is provided for thoroughness and completeness. Like reference character refer to like elements throughout the description.

With particular reference to FIG. 1, there is provided a vehicle 1 comprising a dual fuel internal combustion engine 200. The dual fuel internal combustion engine 200 is connected to a fuel tank arrangement 100, such as e.g. a diesel tank, and to a gas tank (110 in FIG. 2). The fuel tank arrangement 100 and the gas tank 110 will be described in further detail below in relation to the description of FIG. 2. The dual fuel internal combustion engine 200 is hence propelled by both convention fuel such as, e.g. diesel or petrol, as well as by a combustible gas such as e.g. compressed natural gas, DME, biogas, etc. For simplicity of understanding, the combustible gas will in the following be referred to as natural gas, which should not be construed as limiting since the inventive concept is applicable for other type of gaseous fuels as well. The vehicle 1 depicted in FIG. 1 is a heavy duty vehicle, here in the form of a truck, for which the inventive fuel tank arrangement 100, which will be described further below, is particularly suitable for.

Figure 2:
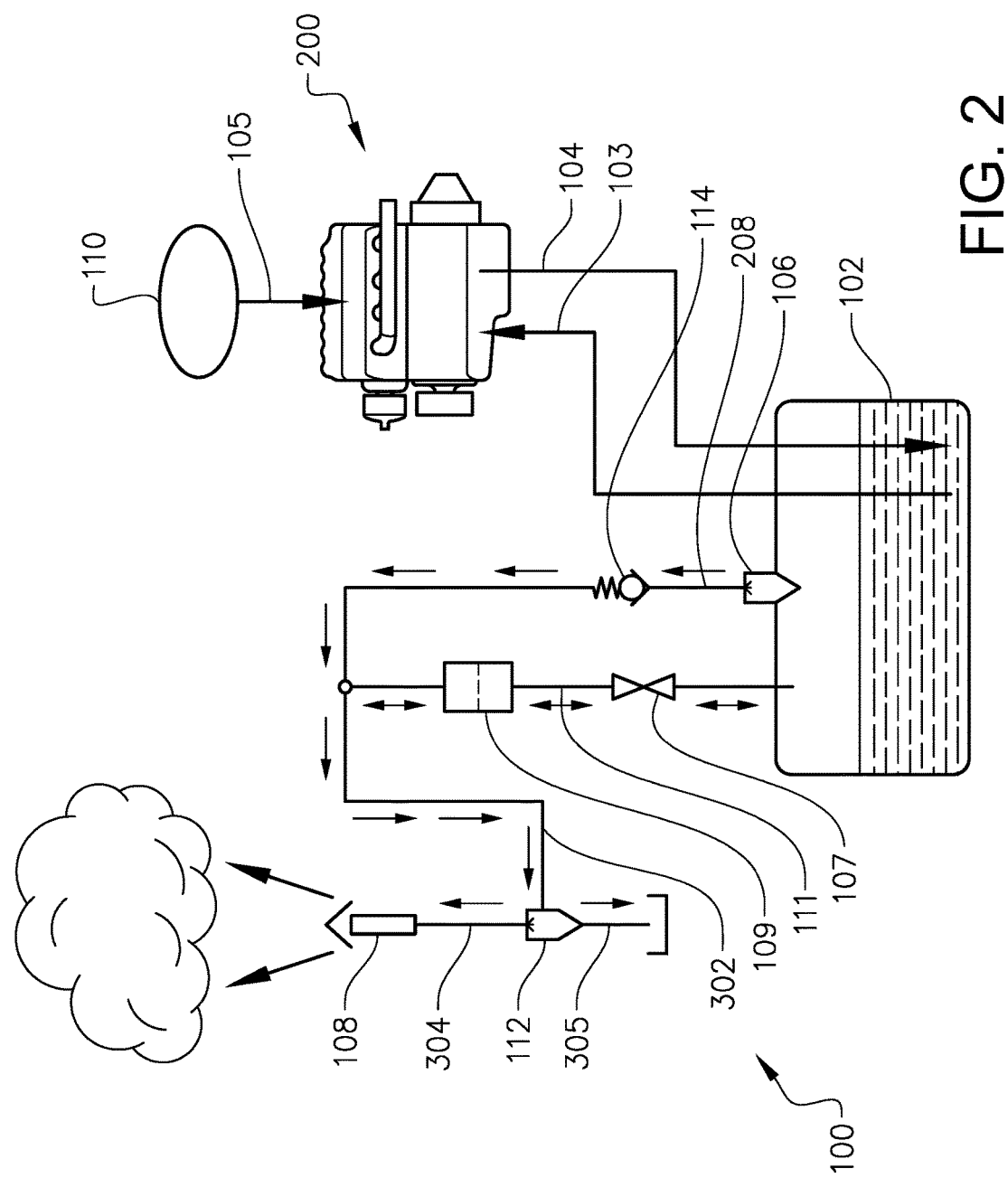
FIG. 2 is a schematic view illustrating an example embodiment of the fuel tank arrangement according to the present invention.

Now, with reference to FIG. 2, a schematic view of an example embodiment of the fuel tank arrangement 100 according to the present invention is depicted. The fuel tank arrangement 100 comprises a fuel tank 102 for storing/containing liquid fuel such as e.g. diesel or petrol, etc. The fuel tank 102 is thus arranged in fluid communication with a dual fuel internal combustion engine 200 via a the conduit 103. The fuel tank arrangement 100 further comprises a combustible gas tank 110 arranged in fluid communication with the dual fuel internal combustion engine 200. More particularly, the combustible gas tank 110 is arranged in fluid communication with the fuel injection system (not shown) of the dual fuel internal combustion engine 200 via a gas conduit 105. Accordingly, the dual fuel internal combustion engine 200 is propelled by both liquid fuel as well as natural gas. The combustible gas tank 110 is preferably a gas pressure vessel arranged to store/contain compressed natural gas, in liquid phase as well as in gas phase. According to a non-limiting example, the dual fuel internal combustion engine may be propelled by up to 95% by natural gas, and thus approximately 5% by liquid fuel.

Furthermore, a return conduit 104 is arranged in fluid communication between the dual fuel internal combustion engine 200 and the fuel tank 102. More specifically, the return conduit 104 is arranged in connection with the fuel injection system of the dual fuel internal combustion engine 200. The return conduit 104 may also be arranged in communication with a combustion chamber (not shown) of the dual fuel internal combustion engine 200. In cases when there is a leakage from the dual fuel internal combustion engine 200, a mixture of liquid fuel and natural gas will be delivered to the fuel tank 102. In the example embodiment, the mixture will be delivered the bottom, or lower portion, of the fuel tank 102, and the gas bubbles will then rise towards the surface of the liquid fuel.

Moreover, a first fuel separation arrangement 106 is positioned in fluid communication with the fuel tank 102. More specifically, and according to the example embodiment depicted in FIG. 2, the first fuel separation arrangement 106 is connected to an upper level, i.e. an upper portion, of the fuel tank 102 as seen in the vertical direction thereof. The first fuel separation arrangement 106 is thus configured to, when liquid fuel and natural gas are received therein, separate the liquid fuel from the natural gas, and thus return the main portion of the liquid fuel back to the fuel tank 102 and transport the natural gas through an outlet conduit 208 arranged downstream the fuel tank 102. A further detailed description of an example embodiment of the first fuel separation arrangement 106 will be given below in relation to the description of FIG. 3. Also, a valve arrangement, in FIG. 2 depicted as a pressure relief valve 114, is arranged downstream the first fuel separation arrangement 106. The pressure relief valve 114 is arranged to be positioned in an opened state for allowing gas to be delivered there through when the pressure in fuel tank 102 exceeds a predetermined pressure limit. Hereby, natural gas is vented from the fuel tank 102 when the pressure in the fuel tank exceeds such predetermined pressure limit. According to a non-limiting example, the pressure relief valve 114 may have an opening pressure range of 0.2 to 0.5 bar.

Furthermore, a second fuel separation arrangement 112 is positioned downstream the pressure relief valve 114. The purpose of the second fuel separation arrangement 112 is to further ensure that liquid fuel is separated from natural gas. Hence, in the unlikely event that liquid fuel is still present as a mixture with natural gas downstream the first fuel separation arrangement 106, the second fuel separation arrangement 112 will hence ensure that the remaining liquid fuel is separated from the natural gas. The separated liquid fuel will be delivered from the second fuel separation arrangement 112 through a conduit 305 to a drain tank or to the fuel tank 102. The conduit 305 may also comprise a plug (not shown) or the like which is arranged to maintain the liquid fuel in the conduit 305. The natural gas on the other hand will be directed towards an outlet 108 to the ambient environment via an outlet conduit 304. Still further, the second fuel separation arrangement 112 also prevents e.g. rain water from the ambient environment to be transported down to the fuel tank 102. Accordingly, the second fuel separation arrangement 112 also separates rain water, or other fluids that may enter the system from the outside, from entering the fuel tank 102. A further detailed description of an example embodiment of the second fuel separation arrangement 112 will be given below in relation to the description of FIG. 4.

Still further, the outlet 108 to the ambient environment is arranged downstream the second fuel separation arrangement 112. According to an example embodiment, the outlet 108 to the ambient environment is positioned at the vent stack (not shown) of the vehicle 1 above the vehicle chassis compartment. In the event that natural gas is leaked to the ambient environment, the safest position to leak the natural gas is at the relatively high point above, and behind, the chassis compartment of the vehicle 1, which position is free from high temperature vehicle components.

The fuel tank arrangement 100 further comprises an air vent valve 107 and an air filter 109, positioned downstream the air vent valve 107, as seen from the fuel tank side, for ventilation of air present in the fuel tank 102. The air vent valve 107 and the air filter 109 are, in the example embodiment depicted in FIG. 2, arranged in fluid communication between the fuel tank 102 and the second fuel separation arrangement 112 via a separate air conduit 111. Filtered air is necessary to add to the fuel tank 102 when liquid fuel is provided to e.g. the dual fuel internal combustion engine 200. Hence, the air vent valve 107 and the air filter 109 separate particles present in the air before the air enters the fuel tank 102.

In order to describe the fuel separation in further detail, the following will describe example embodiments of the first 106 and second 112 fuel separation arrangements. Reference is therefore first made to FIG. 3 which illustrates an example embodiment of the first fuel separation arrangement 106.

Figure 3:
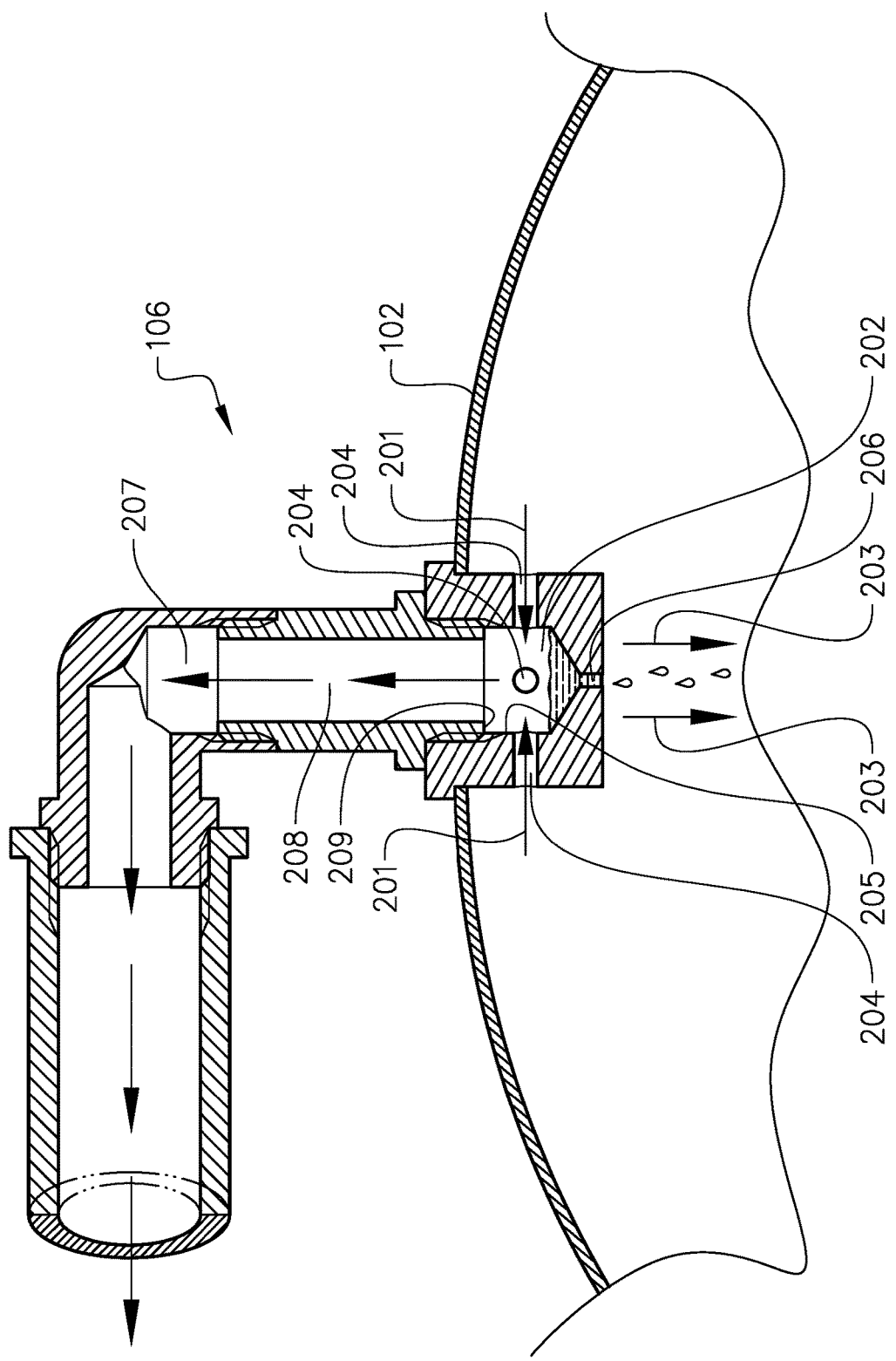
FIG. 3 is a cross-sectional side view of the first fuel separation arrangement according to an example embodiment of the present invention.

Turning to FIG. 3, a cross-sectional side view of an example embodiment of the first fuel separation arrangement 106 is depicted. As can be seen from FIG. 3, the first fuel separation arrangement 106 is positioned at the upper level of the fuel tank 102 and comprises a cavity 202 arranged to receive a mixture of liquid fuel and natural gas from the fuel tank 102 via inlet through-holes 204. In the illustrated embodiment, four (of which three is depicted in FIG. 3 due to the cross-sectional illustration) inlet through-holes 204 are arranged in the first fuel separation arrangement 106. However, the invention is not limited to a specific number of through-holes and other alternatives are of course conceivable, such as two, three, five, six, etc. The cross-sectional area of the inlet through-holes 204. i.e. the sum of the cross-sectional areas of the inlet through-holes 204, is preferably smaller than the cross-sectional area of the cavity 202. Hereby, the velocity of the mixture of liquid fuel and natural gas will be reduced when entering the cavity 202. Also, the cavity 202 comprises an inner wall surface 205 which is arranged approximately perpendicular to the direction of the fluids in the inlet through-holes 204. Thus, the mixture of liquid fuel and natural gas will be directed from the fuel tank 102 into the inlet through-holes 204 and further into the cavity 202 where it will hit the inner wall surface 205 of the cavity 202. Due to the reduction of velocity when entering the cavity 202 and the inner wall surface 205 of the cavity 202, the liquid fuel, which has a higher density than the natural gas, will be directed downwards into the fuel tank 102 via a return through-hole 206. The natural gas on the other hand, which density is less than air, will rise through an outlet conduit 208 and directed away from the first fuel separation arrangement 106. Still further, an edge portion 209, formed by the smaller cross-sectional area of the outlet conduit 208 in comparison to the cross-sectional area of the cavity 202, is arranged at an upper portion of the cavity 202 for preventing liquid fuels from rising into the outlet conduit 208 due to the capillary effect.

For simplicity of understanding, the mixture of liquid fuel and natural gas and air entering the inlet through-holes 204 is depicted by the arrows 201, the liquid fuel directed back to the fuel tank 102 is depicted by the arrows 203 and the natural gas and air rising through the outlet conduit 208 is depicted by the arrows 207.

Figure 4:
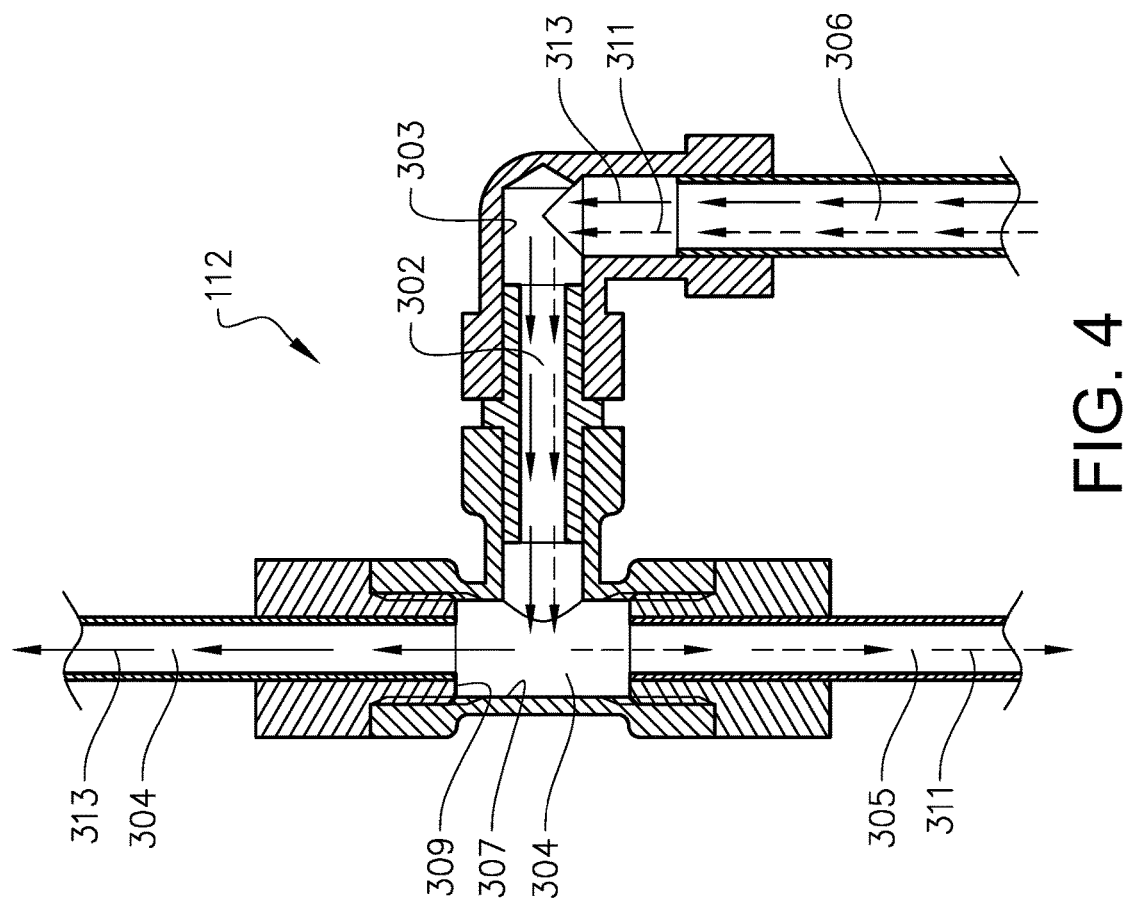
FIG. 4 is a cross-sectional side view of the second fuel separation arrangement according to an example embodiment of the present invention.

Reference is now made to FIG. 4 which illustrates a cross-sectional side view of an example embodiment of the second fuel separation arrangement 112. The second fuel separation arrangement 112 comprises an inlet conduit 302, an outlet conduit 304 and a conduit 305 to the drain tank, the fuel tank 102 or a plug (not shown) as described above. The inlet conduit 302 is in the example embodiment of FIG. 4 connected to a conduit 306. The conduit 306 and the inlet conduit 302 are arranged approximately perpendicular to each other such that an approximately 90 degrees bend is arranged there between. Hereby, when the mixture of liquid fuel and natural gas hits an inner surface 303 of the inlet conduit 302, at least a portion of the liquid fuel will, due to gravity, fall down back through the conduit 306.

Furthermore, a cross-sectional area of the outlet conduit 304 is larger than a cross-sectional area of the inlet conduit 302. Hereby, the velocity of the mixture will be reduced when entering the outlet conduit 304. Still further, the inlet conduit 302 and the outlet conduit 304 may be arranged approximately perpendicular to each other and the outlet conduit 304 comprises an inner wall surface 307. Thus, when the mixture of liquid fuel and natural gas enters the outlet conduit 304, the velocity thereof will be reduced and the mixture will hit the inner wall surface 307. Hereby, the liquid fuel, which density is heavier than the natural gas, will be directed downwards into the conduit 305, while the natural gas, which density is less than air will rise through the outlet conduit 304. Although FIG. 4 illustrates that the inlet conduit 302 and the outlet conduit 304 are arranged perpendicular to each other, it should be readily understood that normal tolerances are within the scope of the present invention. For example, the inlet conduit 302 may be arranged within e.g. 65-115 degrees relative to the outlet conduit 304.

Still further, the outlet conduit 304 comprises an edge portion 309 for preventing liquid fuel from being directed through the outlet conduit 304 due to the capillary effect. The edge portion 309 delimits the outlet conduit 304 into first and second outlet conduits, wherein the first outlet conduit has a larger cross-sectional area than the second outlet conduit. For simplicity of understanding, liquid fuel is depicted by the dashed arrows denoted by 311, while the natural gas and air is depicted by the solid arrows 313.

In order to sum up the flow process of the mixture of liquid fuel and natural gas according to the present invention, reference is made to FIG. 2-4. As seen in FIG. 2, the dual fuel internal combustion engine 200 is provided with natural gas from the gas tank 110 and/or provided with liquid fuel from the fuel tank 102 for propulsion thereof. The mixture of natural gas and liquid fuel is delivered to the fuel injection system of the dual fuel internal combustion engine 200 and in the event that the mixture is leaked, it is delivered to the fuel tank 102 via the return conduit 104.

Furthermore, the natural gas, which is delivered to a bottom portion of the fuel tank 102 will rise towards the surface of the liquid fuel present in the fuel tank 102. Hereby, natural gas will thus be provided in the area of the fuel tank 102 delimited by an inner surface of the fuel tank 102 and the surface of the liquid fuel. Since it is unbeneficial to maintain natural gas in the fuel tank 102, there is a need to vent the fuel tank 102. This may be executed when the pressure in the fuel tank 102 exceeds a predetermined pressure threshold limit which can be controlled by the pressure relief valve 114. When the natural gas present in the fuel tank 102 is to be vented, the natural gas is provided into the first fuel separation arrangement 106. The first fuel separation arrangement 106 is configured to separate liquid fuel that may be accidentally mixed with the natural gas. The liquid fuel is directed back to the fuel tank 102 while the natural gas is directed through the outlet conduit 208 and towards the second fuel separation arrangement 112.

The natural gas is thus directed from the first fuel separation arrangement 106 towards the second fuel separation arrangement 112 and in the unlikely event that liquid fuel is still present as a mix with natural gas when entering the second fuel separation arrangement 112, the second fuel separation arrangement 112 is configured to direct the liquid fuel through the conduit 305 while the natural gas is directed through the outlet conduit 304 of the second fuel separation arrangement 112. The liquid fuel may be directed to a drain tank, to the fuel tank 102 or to a plug arranged in the conduit 305 for controllably draining the liquid fuel at a suitable position. The natural gas may be directed from the outlet conduit 304 of the second fuel separation arrangement 112 and to the ambient environment via the outlet 108 arranged at the vent stack of the vehicle 1, above and behind the chassis compartment thereof.

It is to be understood that the present invention is not limited to the embodiments described above and illustrated in the drawings; rather, the skilled person will recognize that many changes and modifications may be made within the scope of the appended claims. For example, the fuel tank arrangement 100 may in addition comprise a further pressure relief valve (not shown) in direct fluid communication between the fuel tank 102 and the ambient environment. This further pressure relief valve is beneficial in the unlikely event that the pressure relief valve 114 downstream the first fuel separation arrangement 106 is blocked for some reason and the pressure in the fuel tank increases to critical levels and needs to be ventilated.

The invention claimed is:

1. A fuel tank arrangement for a dual fuel internal combustion engine, the fuel tank arrangement comprising a fuel tank arranged to supply liquid fuel to the dual fuel internal combustion engine, wherein the fuel tank arrangement comprises a return conduit connected to the fuel tank and configured to supply leaked fuel from the dual fuel internal combustion engine to the fuel tank, wherein the fuel tank arrangement comprises a first fuel separation arrangement positioned in fluid communication between the fuel tank and an outlet to an ambient environment thereof, wherein the first fuel separation arrangement comprising a cavity, at least one inlet through-hole between the cavity and the fuel tank, a return through-hole between the cavity and the fuel tank, and an outlet conduit in fluid communication with the outlet to the ambient environment, wherein a cross-sectional area of the at least one inlet through-hole is smaller than a cross-sectional area of the cavity.

2. The fuel tank arrangement according to claim 1, wherein the fuel tank arrangement comprises a gas tank arranged to supply combustible gas to the dual fuel internal combustion engine.

3. The fuel tank arrangement according to claim 2, wherein the gas tank is a pressurized gas tank.

4. The fuel tank arrangement according to claim 1, wherein the first fuel separation arrangement is positioned at an upper level of the fuel tank.

5. The fuel tank arrangement according to claim 1, wherein the fuel tank arrangement comprises a second fuel separation arrangement positioned in fluid communication between the first fuel separation arrangement and the outlet to the ambient environment.

6. The fuel tank arrangement according to claim 5, wherein the second fuel separation arrangement comprises an inlet conduit and an outlet conduit arranged in fluid communication with each other.

7. The fuel tank arrangement according to claim 6, wherein the inlet conduit is positioned relative to the outlet conduit with an angle between 65-115 degrees.

8. The fuel tank arrangement according to claim 6, wherein a cross-sectional area of the inlet conduit of the second fuel separation arrangement is smaller than a cross-sectional area of the outlet conduit of the second fuel separation arrangement.

9. The fuel tank arrangement according to claim 6, wherein the fuel tank arrangement comprises a conduit connected upstream the inlet conduit of the second fuel separation arrangement, wherein conduit and inlet conduit of the second fuel separation arrangement are arranged approximately perpendicular relative to each other.

10. The fuel tank arrangement according to claim 1, wherein the fuel tank arrangement comprises a pressure relief valve positioned downstream the first fuel separation arrangement.

11. The fuel tank arrangement according to claim 1, wherein the outlet to the ambient environment is positioned at a level vertically above a vehicle compartment of a vehicle to which the fuel tank arrangement is mounted.

12. A vehicle comprising a dual fuel internal combustion engine for propulsion thereof, wherein the vehicle comprises a fuel tank arrangement according to claim 1.

* * * * *